Sept. 13, 1949.　　　　　S. RUBEN　　　　　2,481,539
METHOD OF MAKING DEPOLARIZER UNITS FOR
ALKALINE PRIMARY CELLS
Filed May 10, 1943
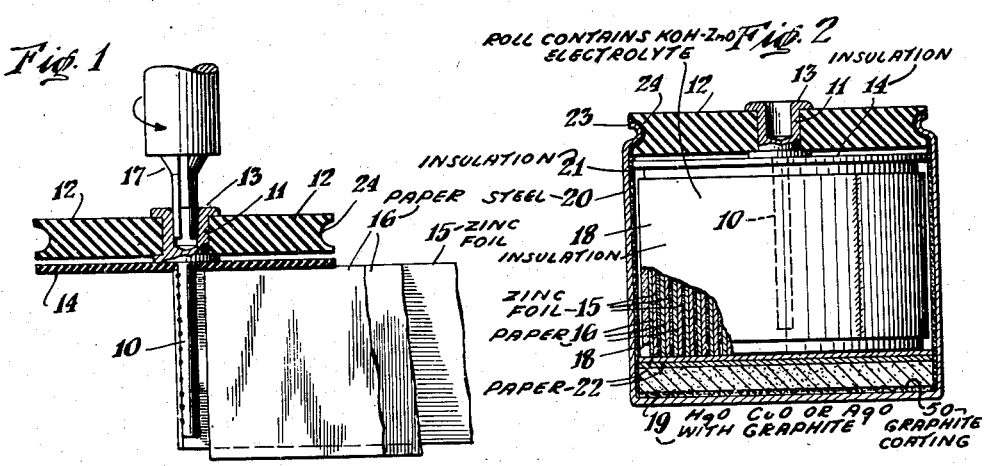
INVENTOR.
Samuel Ruben
BY
Robbin + Carlson
ATTORNEYS Patented Sept. 13, 1949

2,481,539

UNITED STATES PATENT OFFICE 2,481,539

METHOD OF MAKING DEPOLARIZER UNITS FOR ALKALINE PRIMARY CELLS

Samuel Ruben, New Rochelle, N. Y.

Application May 10, 1943, Serial No. 486,367

6 Claims. (Cl. 136—107)

This invention relates to primary cells and electrolytes therefor. Co-pending application Serial No. 604,269 filed July 10, 1945, now Patent 2,422,045, dated June 10, 1947, is a continuation-in-part of this application and claims certain broader aspects of the invention described herein as well as certain specific features. Co-pending application Serial No. 513,687, filed December 10, 1943, now Patent 2,422,046, dated June 10, 1947, describes a cell structure comprising a metal cup having a depolarizing oxide cathode compressed in the bottom thereof.

An object of the invention is to improve primary cells and particularly primary cells of the alkaline type.

Another object is to produce an hermetically sealed "dry" primary cell of the metal oxide-zinc type.

A further object is to provide a method of making cathode-depolarizer units for electric current producing cells.

Other objects of the invention will be apparent from the description and claims.

In the drawing:

Figure 1 is a view showing a method of making a primary cell electrode-terminal assembly; and Figure 2 is a sectional view of a completed primary cell.

Primary cells of the type having a zinc anode, an alkaline electrolyte and a depolarizing electrode of an oxide which is electrolytically reducible are extremely useful but heretofore have had certain serious limitations. One disadvantage of these cells has been the tendency of the zinc electrode with the alkaline electrolyte such as sodium or potassium hydroxide to generate hydrogen gas. The gas accumulates and requires venting of the cell with attendant disadvantages. The rate of reaction between the alkaline electrolyte and the zinc increases exponentially with increase of temperature. At ordinary room temperature in temperate climates the rate of gas generation is relatively slow but at higher temperatures, such as 130° F. which are encountered in the tropics or in certain industrial applications the deterioration and gas generation is so rapid as to render prior art cells entirely unfit for such use. The reaction occurs both on open circuit shelf life and during operation. The shelf life of such prior art cells at high temperatures is so low that the output voltage drops to an unuseably low value in a short time.

A feature of the present invention is the use of an improved electrolyte which has negligible chemical attack upon the zinc during shelf life even at high temperatures such as 130° F. The invention also includes the combination of the improved electrolyte with depolarizer compositions which further improve the life of the cell.

The present invention contemplates an alkaline electrolyte, preferably potassium hydroxide solution, which is saturated prior to use with zinc oxide, (which forms the alkali zincate) so that there is less tendency for the electrolyte to further dissolve the zinc of the electrode or the zinc oxide. The invention also contemplates a zinc electrode of increased surface area to permit operation of the cell after the zinc electrode has been coated with a film of zinc oxide, or hydroxide. In its preferred form the invention also embodies the use of mercuric oxide as a depolarizer in combination with the zincate saturated electrolyte.

Cupric oxide, which has been used heretofore as a depolarizer in alkaline cells, is somewhat soluble in alkaline electrolytes and when the cell is left on open circuit some of the copper compound may dissolve in the electrolyte and migrate to the zinc electrode, where copper is deposited, setting up local electrochemical action and causing rapid dissolution of the zinc electrode. This action is much accelerated when the temperature of the cell is increased. The presence of zincate in the electrolyte and porous spacers and on the anode materially reduces this deleterious effect.

However, in order to still further improve the shelf life of the cell and render it suitable for tropical use and for use after shelf life under extreme temperature conditions, such as at 130° F., mercuric oxide is used instead of cupric oxide as the depolarizer. Since this oxide is a poor conductor of electricity in its pure state it is mixed with a finely divided conductor such as graphite or a metal and bonded to a conductive backing.

Referring to the drawing, Figures 1 and 2 illustrate the construction of a hermetically sealed "dry" primary cell embodying features of the invention. In Figure 1 the method of making a sub-assembly of the anode, the anode terminal and cell top is shown. A zinc mandrel 10 having a recessed rivet head 11 is secured in the central aperture of insulating top disc 12 formed of dielectine, Bakelite, polystyrene, or other alkali resistant sheet insulating material, by spreading out the flange 13 of the rivet head. A mica washer 14 is slipped over the mandrel and a strip of zinc foil 15 is welded at one end to the mandrel 10. By way of example, the zinc foil may be 2 mils thick, ¼ inch wide and 22 inches long.

A pair of porous paper strips 16 such as 4 mil Dexter paper ⅜ inch wide are dusted or brushed with a small quantity of mercuric oxide powder to amalgamate the surface of the zinc when the cell is impregnated. These paper strips are laid on the zinc foil strip and the foil and paper are wound onto the mandrel 10 forming a roll. This may conveniently be done by placing the mandrel on a rotating chuck 17 which expands inside rivet head 11 to engage it. When the foil and paper are wound up a sleeve 18 of Pliofilm (Figure 2) is slipped over the winding.

The depolarizing oxide composition 19 is pressed into the bottom of an iron or steel cup 20 to form the cathode-container sub-assembly. It is desirable to insulate the side walls of the iron or steel cup with an insulating layer 21 to reduce local potential between the mercuric oxide and the iron and to reduce polarization currents to the zinc through any fortuitous contact with the paper of the roll. Insulating layer 21 may be a Koroseal lacquer sprayed onto the steel cup or an oxide coating integrally formed thereon. Such a layer may be produced by heating the steel or iron cup to a high temperature in an air current containing water vapor. Prior to oxidation the bottom of the cup is painted on the inside with a graphite suspension 50 (Aquadag) which protects this portion from oxidizing and permits a good electric contact to be formed with the depolarizer which is subsequently pressed into the bottom.

The preferred depolarizer composition is a mixture of finely divided mercuric oxide and about 10% micronized graphite of extremely fine particle size such as 5 to 9 microns. The mixture is first pressed into a pellet of slightly smaller diameter than the inside of the iron cup at about 1000 pounds per square inch pressure in a Stokes press or pilling machine. The pellet is then pressed into the bottom of the cup at a pressure of 20,000 pounds per square inch.

The previously prepared filtered potassium hydroxide-potassium zincate electrolyte is heated to 80° C. and the wound zinc electrode is immersed in this solution for 30 minutes. A vacuum is preferably applied to the bath to insure complete impregnation.

As previously mentioned, the paper spacers are dusted with a small quantity of mercuric oxide powder. When these are wound up with the zinc foil the mercuric oxide is brought into contact with its surface. This oxide is reduced during impregnation, the resulting mercury being sufficient to completely amalgamate the surface of the zinc. This reduces gas generation at the zinc surface due to contact impurities on the zinc. This affords a simple and practical method of amalgamating the zinc surface. Since the zinc foil becomes brittle when amalgamated it is impracticable to amalgamate it prior to winding.

While the anode assembly is being impregnated the cup 20 into which the oxide cathode has been pressed is filled with electrolyte which is allowed to stand in the cup until the cell is ready to be assembled. The electrolyte is then emptied from the cup and a pair of porous Dexter paper discs 22 are laid in the bottom to cover the depolarizer layer. The anode assembly is then inserted in the cup and the top edge 23 of the cup is spun into a groove 24 in the edge of top 12 to complete the cell. The paper discs 22 quickly draw electrolyte from the contiguous surfaces and the anode roll by capillary action and thus become impregnated. Koroseal, rubber or other plastic material may be used as a sealing layer at the edge of the top.

For tropical and other high temperature conditions, mercuric oxide in combination with the zincate electrolyte affords maximum shelf life. The mercuric oxide gives an open circuit potential of about 1.36 volts per cell.

For use at lower temperatures, such as are encountered in temperate climates, cupric oxide or silver oxide may be substituted for mercuric oxide. Silver oxide has the advantage of giving a higher voltage, namely about 1.6 volts. Cupric oxide gives a lower voltage, about .9 volt per cell, but gives a cell of much longer life. Mercuric oxide will give a cell having about .24 ampere hours per gram of oxide and silver oxide about .22 ampere hours while cupric oxide yields about .58 ampere hours per gram. Where a lower voltage can be used or where it is convenient to connect two or more cells in series the CuO cell is very economical.

Whichever depolarizer is used is mixed with a finely divided conductive material such as graphite, carbon, or finely divided metals such as silver or iron reduced by hydrogen.

At high temperature in order to obtain maximum life it is desirable to restrict the dissolution or suspension of the depolarizer oxide into the electrolyte which oxide would be reduced to the metal by contact with the zinc electrode and thereby reduce the total available amount of depolarizer capacity also utilizing some of the zinc anode due to local action. This can be done by use of semi-permeable films, solid electrolytes or use of porous ceramic discs that are in contact with the oxide and prevent free circulation of any dissolved or suspended component.

While specific embodiments of the invention have been described, it is intended to cover the invention broadly within the spirit and scope of the appended claims.

What is claimed is:

1. The method of making a cathode-depolarizer assembly for primary cells which comprises compressing a measured amount of an oxygen-yielding electrically conducting depolarizer composition to form a cathode-depolarizer pellet, placing said pellet in a metal casing, and then applying consolidating pressure to said pellet to produce a strong mechanical bond of low electrical resistance between said consolidated pellet and the inner surface of the casing.

2. The method of making a cathode-depolarizer terminal assembly for primary cells which comprises pressing a predetermined quantity of an oxygen-yielding electrolytically reducible and electrically conducting composition to form a cathode-depolarizer pellet, placing said pellet in an open-ended metal cup having larger dimensions than the pellet, and then applying consolidating pressure to said pellet to cause plastic deformation thereof and the production of a permanent mechanical bond of low electrical resistance between said deformed pellet and the cup constituting the cathode terminal of the cell.

3. The method of making a cathode-depolarizer terminal assembly for primary cells which comprises pressing an intimate mixture of an oxygen-yielding electrolytically reducible compound of low electrical conductivity and of an inert material of substantially higher conductivity to form a cathode-depolarizer pellet, inserting said pellet in a metal housing having larger dimensions than said pellet, and applying consolidating pressure to said pellet greatly exceeding the pelleting pressure to cause plastic deformation and consolidation of the pellet whereby the pellet will accurately conform to the inner surface of the housing in contact therewith and will be strongly bonded thereto by a bond of low electrical resistance.

4. The method of making a cathode-depolarizer terminal assembly for primary cells which comprises pressing an intimate mixture of an electrolytically reducible oxygen-yielding compound of relatively low electrical conductivity and of sufficient finely divided graphite to form a coherent cathode-depolarizer pellet of increased conductivity, inserting said pellet into a metal housing constituting the cathode terminal of the cell, and applying consolidating pressure several times greater than the pelleting pressure to the pellet in said housing, said pellet having dimensions initially smaller than those of the housing but as a result of the limited plastic flow of its particles under the consolidating pressure being caused to accurately conform to and to firmly bond to the inner surface of the housing in contact therewith thereby providing a junction of low electrical resistance.

5. The method of making a cathode-depolarizer terminal assembly for primary cells which comprises mixing particles of a relatively non-conductive electrolytically dissociable oxygen-yielding compound with finely divided graphite, compressing a predetermined amount of said mixture to form a cathode-depolarizer pellet, placing said pellet in a metal housing constituting an external cell terminal member, and applying pressure so as to consolidate and integrally join said pellet with said metal housing and provide a junction of low electrical resistance between said cathode-depolarizer and said housing terminal member.

6. In the manufacture of electric current producing cells, the steps which comprise compressing a predetermined amount of a depolarizer composition into a pellet, placing the pellet in a metal container having dimensions in excess of said pellet, and consolidating the depolarizer with said metal container by placing said pellet into said container and compressing same at a pressure greater than that employed in initially forming said depolarizer into a pellet.

SAMUEL RUBEN.

REFERENCES CITED

The following references are of record in the file of this patent:

UNITED STATES PATENTS

| Number | Name | Date |
| --- | --- | --- |
| Re. 13,174 | Morrison | Nov. 22, 1910 |
| 350,297 | Desruelles | Oct. 5, 1886 |
| 389,140 | Eaton | Sept. 4, 1888 |
| 405,196 | Barrett | June 11, 1889 |
| 415,593 | Watson | Nov. 19, 1889 |
| 429,896 | Felt | June 10, 1890 |
| 669,007 | Evanson | Feb. 26, 1901 |
| 732,842 | Gardiner | July 7, 1903 |
| 975,885 | Morrison | Nov. 15, 1910 |
| 1,015,735 | Heuser | Jan. 23, 1912 |
| 1,017,064 | Smith et al. | Feb. 13, 1912 |
| 1,028,354 | Heil | June 4, 1912 |
| 1,145,950 | Ward | July 13, 1915 |
| 1,219,074 | Bronsted | Mar. 13, 1917 |
| 1,231,057 | Palmer | June 26, 1917 |
| 1,406,429 | Vinal et al. | Feb. 14, 1922 |
| 1,486,172 | Wilhelm | Mar. 11, 1924 |
| 1,644,344 | Martus et al. | Oct. 4, 1927 |
| 1,835,868 | Heise | Dec. 8, 1931 |
| 1,864,652 | Heise | June 28, 1932 |
| 1,955,115 | Drumm | Apr. 17, 1934 |
| 2,307,765 | Deibel | Jan. 12, 1943 |
| 2,317,711 | Andre | Apr. 27, 1943 |

FOREIGN PATENTS

| Number | Country | Date |
| --- | --- | --- |
| 2,687 | Great Britain | 1915 |
| 16,471 | Great Britain | 1915 |
| 29,138 | Great Britain | 1904 |
| 228,802 | Great Britain | Feb. 12, 1925 |
| 493,694 | Great Britain | Oct. 12, 1938 |

OTHER REFERENCES

Crennel & Lea, "Alkaline Accumulators" (1928), page 99.

Vinal, G. W., "Storage Batteries" 3rd ed. (1940), page 189.